United States Patent Office 3,642,805
Patented Feb. 15, 1972

3,642,805
CERTAIN ARALKYL DERIVATIVES OF
N-ACYLATED HYDROXYLAMINES
Lajos Kisfaludy, Agnes Patty nee Lukats, Lajos Dancsi, Livio Dömök nee Kis-Vigh, Egon Karpati, and Laszlo Szporny, Budapest, Hungary, assignors to Richter Gedeon Vegyeszeti Gyra Rt, Budapest, Hungary
No Drawing. Filed Mar. 26, 1969, Ser. No. 810,822
Claims priority, application Hungary, Mar. 30, 1968,
RI-343
Int. Cl. C07d 31/36
U.S. Cl. 260—295 AM                    6 Claims

ABSTRACT OF THE DISCLOSURE

New N-acylated hydroxylamine derivatives of the formula

Ac—NH—O—X wherein Ac is an acyl group of a carboxylic acid containing one or more basic nitrogen atoms with the exception of the aliphatic amino acids leucine, valine and alanine and X is an aralkyl group unsubstituted or substituted by halogen, lower alkyl, lower alkoxy or the nitro group, and the pharmaceutically acceptable acid addition salts thereof, having hypotensive and sedative effect. The new compounds are prepared by N-acylating an O-substituted hydroxylamine of the formula H₂N—OX with the corresponding amino acid or a reactive derivative thereof or by O-aralkylating N-acylated hydroxylamines Ac—NH—OH with an aralkyl halide Hal—X.

---

The invention relates to novel hydroxylamine derivatives having a valuable hypotensive effect.

It has been found surprisingly that the hydroxylamine derivatives of the general formula Ac—NH—O—X                    (I)

wherein Ac stands for an acyl group of a carboxylic acid containing one or more basic nitrogen atoms but with the exception of the aliphatic amino acids leucine, valine and alanine, and X stands for an unsubstituted or substituted aralkyl group, and the therapeutically acceptable acid addition salts thereof, have valuable pharmacological properties, especially a long-lasting lowering effect on the blood pressure; some of these compounds show also sedative or hypnotic effects and they have in general low toxicity. The hypotensive effect of these new compounds is brought about in a way different from the similar effect of the hypotensive agents known hitherto; this difference of the mode of action is shown first of all by the fact that the hypotensive effect of the new compounds is not accompanied by sympathetic neuron blocking, adrenolytic action, ganglion blocking and spasmolytic effects.

The acyl residue Ac of the new compounds of the general Formula I may contain one or more basic nitrogen atoms in aliphatic chains or alicyclic or aromatic rings or in side chains thereof. It can be e.g. the acyl residue of glycine, or of other amino acids other than the above mentioned alanine, leucine or valine, especially of substituted or cyclic amino acids e.g. of serine or proline, or of aromatic heterocyclic carboxylic acids as of nicotinic, or isonicotinic acid. The substituent X of the hydroxyl group of the new hydroxylamine derivatives of the general Formula I can be first of all a benzyl or substituted benzyl radical; it may be, however, any other unsubstituted or substituted aralkyl. The substituents of these aralkyl radicals may be halogen atoms, nitro, lower alkyl or lower alkoxy groups.

The new hydroxylamine derivatives of the general Formula I can be prepared by reacting an O-substituted hydroxylamine of the general formula

H₂N—O—X                    (II)

wherein X has the same meaning as above, with an organic acid containing one or more basic nitrogen atoms and having the general formula Ac—OH                    (III)

wherein Ac has the same meaning as above, or with a reactive derivative thereof. The compounds of the general Formula III or the reactive derivatives thereof in which the basic groups contain replaceable hydrogen atoms, are preferably used in an N-protected form, i.e. their basic groups can be preferably protected by removable protective groups, e.g. by tert. butyloxycarbonyl, carbobenzoxy or p-chlorocarbobenzoxy groups.

According to a preferred method, the new compounds of the general Formula I can be prepared by reacting the O-substituted hydroxylamine derivative of the general Formula II with a carboxyl-activated and possibly N-protected amino acid derivative of the general formula Y—Ac'—Z                    (IV)

wherein Y—Ac' stands for an acyl group corresponding to the above definition of Ac, in which Y represents hydrogen or a removable protective group attached to the basic nitrogen atom of the group Ac' and Z stands for an azide or an ester residue activating the carboxyl function, e.g. for a halogen atom, a p-nitrophenoxy or pentachlorophenoxy group, to yield as reaction product a compound of the general formula Y—Ac'—NH—O—X                    (V)

wherein Y—Ac' and X have the same meaning as above, and then in cases when Y a removable protective group, the group Y is split off in a manner known per se.

In an especially preferred embodiment of this process, the amino group of the starting amino acid of the general Formula III is protected by acylating it with a carbobenzoxy, p-chlorocarbobenzoxy or tert. butyloxycarbonyl group and the carboxyl group thereof is converted into an acid chloride or an active ester e.g. a pentachlorophenyl or p-nitrophenyl group. If the starting amino acid is reacted in such a protected and activated form (corresponding to the general Formula IV) with the hydroxylamine derivative of the general Formula II, the reaction proceeds smoothly and without any side reactions, and the N-protected product of the general Formula V is obtained with excellent yields. This product can be then converted in a simple way, by acid treatment or by catalytic hydrogenation into the end product of the general Formula I.

According to another method, the new compounds of the general Formula I can be prepared also by reacting an N-acylated hydroxylamine (a hydroxamic acid) of the general Formula VI Ac—NH—OH                    (VI)

wherein Ac as the same meaning as above, or a derivative thereof protected on the basic nitrogen atom by a removable protective group, with an aralkyl halide of the general Formula VII Hal—X                    (VII)

wherein Hal represents a halogen atom, preferably chlorine, and X has the same meaning as above. This reaction may be carried out in the presence of an acid binding agent e.g. of an alkali metal, an alkali alkoxide or an alkali hydroxide.

Depending on the starting materials and the reaction conditions, the products of the general Formula I are obtained either in the form of free bases or of acid addition salts by the usual methods, and the free bases can be converted into therapeutically acceptable acid addition salts by reacting them with the appropriate acids in a known manner.

The new compounds of the Formula I and the therapeutically acceptable acid addition salts thereof show, as stated above, hypotensive activity; they have further sedative or hypnotic effects. The hypotensive activity is especially marked in the case of compounds of the general Formula I containing substituted benzyl groups in the place of X and cyclic amino acyl groups, e.g. prolyl groups in the place of Ac; e.g. the compound N-L-proyly-O-(p-nitrobenzyl)-hydroxylamine (cf. Example 1) decreases the blood pressure of narcotized cats in i.v. doses of 25–30 mg./kg. to 50% of its original value. The $LD_{50}$ value measured in the same way is higher than 200 mg./kg. The decrease of the blood pressure lasts for a prolonged period, i.e. for several hours. The hypnotic or sedative effects are more marked in the case of compounds of the general Formula I having an unsubstituted benzyl group in the place of X and a basic aromatic acyl group, e.g. a nicotinoyl or isonicotinoyl group in the place of Ac, as e.g. the compound N-nicotinoyl-O-benzyl-hydroxylamine (cf. Example 7) which shows on mice a hypnotic effect in i.v. doses of 38 mg./kg. ($ED_{50}$ value); its $LD_{50}$ value is under similar conditions 140 mg./kg. The hypnotic effect of these compounds is extremely short-lasting, and no postnarcotic effects can be observed.

The new compounds of the general Formula I can be used in therapy by oral, rectal or parenteral administration; the daily doses for adult persons may be between 25 and 300 mg. in the case of oral administration and 5 to 150 mg. in the case of parenteral administration.

The invention is illustrated in further detail by the following examples:

EXAMPLE 1

N-L-prolyl-O-benzyl-hydroxylamine hydrochloride (a) 1.6 g. (0.01 mol) of O-benzyl-hydroxylamine hydrochloride are dissolved in 25 ml. of abs. dimethyl formamide and 1.39 g. (0.01 mol) of triethyl amine are added at 0° C. After stirring for 15 minutes, the triethyl amine salt is filtered off and 4.64 g. of N-tert.-butyloxycarbonyl-L-proline pentachlorophenyl ester are added to the filtrate. The mixture is stirred for another two hours and the solvent is then distilled off in vacuo at a temperature not exceeding 50° C. The residue is recrystallized from ethyl acetate. 2.65 g. (77.5%) of N-(tert.-butyloxycarbonyl) L-prolyl-O-benzyl-hydroxylamine are obtained; M.P. 175–176° C. This chromatographically pure product shows an $R_f$-value of 0.85 (in the system ethyl acetate-pyridine-glacial acetic acid-water 30:2.5:0.75:1.4).

(b) 2.42 g. (0.0071 mol) of N-(tert.-butyloxycarbonyl)-L-prolyl-O-benzyl-hydroxylamine suspended in 10 ml. of abs. ether are cooled to 0° C. and 10 ml. of a 4 N hydrogen chloride solution in ethyl acetate are added under stirring. The mixture is stirred at room temperature for another 20 minutes and the precipitated crystalline product is separated by filtration. 1.80 g. (99% of the theoretical yield) of N-L-prolyl-O-benzyl-hydroxylamine hydrochloride are obtained; M.P. 179° C. The product recrystallized from a mixture of ethanol and ether melts at 183–184° C.; $R_f$-value 0.2 (ethyl acetate-pyridine-glacial acetic acid-water 18:12:3.6:6.6).

*Analysis.*—Calculated (percent) C, 56.2; H, 6.7; N, 11.0; Cl, 13.8. Found (percent): C, 56.2; H, 6.9; N, 11.2; Cl, 13.8.

EXAMPLE 2

N-L-prolyl-O-p-nitrobenzyl-hydroxylamine hydrochloride (a) 1.44 g. (0.007 mol) of O-p-nitrobenzyl-hydroxylamine hydrochloride are dissolved in 20 ml. of abs. dimethyl formamide and 0.98 ml. (0.007 mol) of triethyl amine is added to the stirred and cooled solution. After further stirring for 15 minutes, the triethyl amine salt is filtered off and 3.24 g. (0.007 mol) N-tert.-butyloxycarbonyl-proline pentachlorophenyl ester are added to the filtrate. The mixture is allowed to stand overnight and then evaporated under reduced pressure. The residue is recrystallized from a mixture of ethyl acetate and hexane. 2.15 g. (83.2% of the theoretical yield) N-(tert.-butyloxycarbonyl-L-prolyl-O-p-nitrobenzyl-hydroxylamine are obtained; M.P. 145° C. $R_f$-value (measured as in Example 1(a) 0.82).

(b) To 2.13 g. (0.0058 mol) N-(tert.-butyloxycarbonyl)-L-prolyl-O-p-nitrobenzyl-hydroxylamine 8 ml. of a 4 N hydrogen chloride solution in ethyl acetate are added and the mixture is stirred for 15 minutes at room temperature. 16 ml. of dry ether are then added and after further stirring for 10 minutes the crystalline product is collected, washed with ether and dried. 1.66 g. (94% of the theoretical yield) of N - L - prolyl-O-p-nitrobenzyl-hydroxylamine hydrochloride are obtained: M.P. 143–145° C. After recrystallization from a mixture of ethanol and ether the hydrochloride melts at 152–155° C.; $R_f$-value (measured as in Example 1(b) 0.2).

*Analysis.*—Calculated (percent): C, 47.8; H, 5.4; N, 13.9; Cl, 11.7. Found (percent): C, 47.7; H, 5.4; N, 13.7; Cl, 11.6.

EXAMPLE 3

N-L-seryl-O-p-chlorobenzyl-hydroxyamine hydrochloride (a) From 0.74 g. (0.0038 mol) of O-p-chlorobenzyl-hydroxylamine hydrochloride dissolved in 10 ml. of dimethyl formamide the base is set free as in Example 1. To the solution of the free base obtained in this way 1.75 g. (0.038 mol) of N-tert-butyloxycarbonyl-L-serine pentachlorophenyl ester are added and the reaction mixture is allowed to stand overnight. The solvent is then distilled off under reduced pressure and the residue is recrystallized from a mixture of ethyl acetate and hexane. 1.0. g. (77% of the theoretical yield) of N-(tert.-butyloxycarbonyl) - L - seryl-O-p-chlorobenzyl-hydroxylamine is obtained; M.P. 129–131° C. $R_f$-value (measured as in Example 1(a) 0.85).

(b) To 1.0 g. (0.0029 mol) of N-tert.-butyloxycarbonyl) - L - seryl - O - p - chlorobenzyl-hydroxylamine 3.0 ml. of a 4 N solution of hydrogen chloride in ethyl acetate are added. The mixture is stirred for 15 minutes and 6 ml. of dry ether are then added thereto. After further stirring for 15 minutes, the crystalline product is collected, washed with dry ether and dried. 0.74 g. (91% of the theoretical yield) of N - L - seryl-O-p-chlorobenzyl-hydroxylamine hydrochloride is obtained. After recrystallization from a mixture of ethanol and ether the product melts at 183–185° C.; $R_f$-value (measured as in Example 1(b) 0.08).

*Analysis.*—Calculated (percent): C, 44.5; H, 5.1; Cl⁻, 12.1; N, 9.95; Cl, 24.2. Found (percent): C, 44.2; H, 5.2; Cl⁻, 12.1; N, 10.05; Cl, 24.0.

EXAMPLE 4

N-L-seryl-O-benzyl-hydroxylamine hydrochloride and hydrobromide (a) From a solution of 0.6 g. (0.0038 mol) of O-benzyl-hydroxylamine hydrochloride in 10 ml. of dimethyl formamide the base is set free as in Example 1. To the free base obtained in this way 1.75 g. (0.0038 mol) of N-tert.-butyloxy-carbonyl-L - serine pentachlorophenyl ester are added and the reaction mixture is allowed to stand overnight. The solvent is then evaporated under reduced pressure and the residue is recrystallized from a mixture of ethyl acetate and hexane. 0.95 g. (80.5% of the theoretical yield) of N - (tert.-butyl-oxycarbonyl)-L-seryl-O-benzyl-hydroxylamine are obtained; M.P. 134–136° C. $R_f$-value (measured as in Example 1(b) 0.90).

(b) From this N-protected compound the N-L-seryl-O- benzyl-hydroxylamine hydrochloride is obtained by the method described in Example 3(b); M.P. 145–146° C.

*Analysis.*—Calculated (percent): C, 48.7; H, 6.2; N, 11.4; Cl⁻, 14.4. Found (percent): C, 48.9; H, 6.3; N, 11.3; Cl⁻, 14.4.

(c) The protective group of the N - (tert.-butyloxy-carbonyl)-L-seryl-O - benzyl - hydroxylamine or of N-carbobenzoxy-L-seryl-O-benzyl - hydroxylamine—the latter can be prepared by reacting O-benzyl-hydroxylamine with N-carbobenzoxy-serine similarly to the process described in claim 1(a)—may be split off also by heating the N-protected compound with a 25% solution of hydrobromic acid in glacial acetic acid. The N-L-seryl-O-benzyl-hydroxylamine hydrobromide obtained in this way melts at 138–140° C.

*Analysis.*—Calculated (percent): C, 41.2; H, 5.2; N, 9.6; Br⁻, 27.5. Found (percent): C, 41.5; H, 5.2; N, 9.9; Br⁻, 26.8.

EXAMPLE 5

N-L-phenylalanyl-O-benzyl-hydroxylamine hydrobromide 2.5 g. (0.0062 mol) N-carbobenzoxy-L-phenylalanyl-O-benzyl-hydroxylamine—M.P. 145–146° C., prepared by reacting O-benzyl-hydroxylamine with N-carbobenzoxy-L-phenylalanine as described in Example 1—are treated with 10 ml. of a 25% solution of hydrobromic acid in glacial acetic acid under the exclusion of atmospheric humidity. The mixture is allowed to stand at room temperature for 30 minutes, and the reaction product is then precipitated by adding 100 ml. of dry ether. After filtering, washing with dry ether and drying, 1.56 g. (72% of the theoretical yield) of N-L-phenyl-alanyl-O-benzyl-hydroxylamine hydrobromide are obtained; M.P. 174–176° C.

*Analysis.*—Calculated (percent): C. 54.7; H, 5.5; N, 8.0; Br⁻, 22.8. Found (percent): C, 54.2; H, 5.4; N, 7.8; Br⁻, 22.9.

EXAMPLE 6

N-glycylglycyl-O-benzyl-hydroxylamine hydrobromide 2.25 g. (0.0061 mol) of N-carbobenzoxy-glycylglycyl-O-benzyl-hydroxylamine—M.P. 169–170° C.; prepared by reacting O-benzyl-hydroxylamine with N-carbobenzoxy-glycyl-glycine—are treated with 9 ml. of a 25% solution of hydrobromic acid in glacial acetic acid, as described in Example 5. 1.9 g. (99% of the theoretical yield) of N-glycylglycyl-O-benzyl - hydroxylamine hydrobromide are obtained; M.P. 163–164° C. After recrystallization from a mixture of ethanol and ether, the product melts at 167° C.

*Analysis.*—Calculated (percent): C, 41.5; H, 5.0; N, 13.2; Br⁻, 25.1. Found (percent): C, 41.5; H, 5.3; N, 13.0; Br⁻, 25.0.

The following compounds were also prepared by the methods described in Examples 1 to 6, using the corresponding N-protected amino acids and O-substituted hydroxylamines as starting materials:

N-(carbobenzoxy)-L-seryl - O - benzylhydroxylamine. M.P. 124–126° C.

*Analysis.*—Calculated (percent): C, 62.8; H, 5.8; N, 8.1. Found (percent): C, 63.2; H, 6.2; N, 8.3.

N - (carbobenzoxy) - DL - seryl - O-benzyl-hydroxylamine. M.P. 105° C. (ethanol).

*Analysis.*— Calculated (percent): C, 62.8; H, 5.8; N, 8.1; O, 23.2. Found (percent): C, 62.8; H, 5.8; N, 8.2; O, 22.7.

N - (carbobenzoxy) - glycyl - O-benzylhydroxylamine. M.P. 127–128° C.

*Analysis.*—Calculated (percent): C, 65.0; H, 5.7; N, 8.9. Found (percent): C, 65.4; H, 6.0; N, 9.1.

N - (p - chlorocarbobenzoxy)-L-methionyl-O-benzyl-hydroxylamine. M.P. 155–156° C.

*Analysis.*—Calculated (percent): C, 55.7; H, 5.1; N, 7.0; Cl, 8.7; S, 7.8. Found (percent): C, 56.1; H, 5.5; N, 7.0; Cl, 58.; S, 7.6.

N - (di - p - chlorocarbobenzoxy)-L-lysyl-O-benzyl-hydroxylamine. M.P. 145–146° C.

*Analysis.*—Calculated (percent): C, 59.2; H, 5.3; N, 7.2; Cl, 12.0. Found (percent): C, 59.2; H, 5.7; N, 7.3; Cl, 11.6.

N - (carbobenzoxy - S - benzyl)-L-cysteinyl-L-tyrosyl-O-benzylhydroxylamine. M.P. 171–172° C.

*Analysis.*—Calculated (percent): C, 66.5; H, 5.1; N, 6.8; S, 5.2. Found (percent): C, 66.1; H, 5.9; N, 6.6; S, 4.9.

N - L - seryl-O-p-nitrobenzylhydroxylamine HCl. M.P. 193–194° C.

*Analysis.*—Calculated (percent): C, 41.3; H, 4.7; N, 14.5; Cl, 12.2. Found (percent): C, 41.4; H, 4.6; N, 14.5; Cl, 12.3.

N - glycyl - O - benzylhydroxylamine HBr. M.P. 125–128° C.

*Analysis.*—Calculated (percent): C, 41.3; H, 5.0; N, 10.7; Br⁻, 30.6 Found (percent): C, 41.3; H, 5.2; N, 10.8; Br⁻, 30.6.

N - (S - benzyl) - L - cysteinyl-L-tyrosyl-O-benzyl-hydroxylamine HBr. M.P. 200–201° C.

*Analysis.*—Calculated (percent): C, 55.9; H, 5.2; N, 7.6; Br⁻, 14.3. Found (percent): C, 55.7; H, 5.6; N, 7.4; Br⁻, 14.4.

EXAMPLE 7

N-isonicotinoyl-O-p-chlorophenyl-hydroxylamine hydrochloride 0.97 g. (0.005 mol) of O-p-chlorobenzyl-hydroxylamine hydrochloride are dissolved in 15 ml. of dry pyridine, the solution is cooled to 0° C. and 0.70 ml. (0.005 mol) of triethyl amine are added under stirring. The triethyl amine salt formed is filtered off and a solution of 2.67 g. (0.015 mol) of isonicotinic acid chloride hydrochloride in 15 ml. of dry pyridine and then 2.10 ml. (0.015 mol) of triethyl amine are added. The reaction mixture is then stirred at 80° C. for two hours and then allowed to stand overnight. The salt precipitated is then filtered off and the solution is evaporated to dryness under reduced pressure. The residue is treated with a two-phase mixture 25 ml. of ethyl acetate and 25 ml. of N sodium hydroxide solution. The organic layer is separated, washed with water, dried and evaporated to dryness, the residue is treated with 7 ml. of a 3 N hydrogen chloride solution in ethyl acetate, and the N-isonicotinoyl-O-p-chlorobenzyl-hydroxylamine hydrochloric is precipitated by adding hexane to the solution. The product is recrystallized from hot ethanol by adding a few drops of hexane; M.P. 212–214° C.

*Analysis.*—Calculated (percent): C, 52.2; H, 4.5; N, 9.4; Cl, 24.7. Found (percent): C, 52.4; H, 4.6; N, 9.6; Cl, 24.7.

The following compounds were prepared similarly to the method described in Example 7, using nicotinic acid chloride and the corresponding O-substituted hydroxylamines as starting materials:

N - nicotinoyl-O-benzylhydroxylamine. M.P. 75–78° C.

*Analysis.*—Calculated (percent): C, 68.5; H, 5.3; N, 12.3; O, 14.1. Found (percent): C, 68.3; H, 5.0; N, 12.3; O, 14.0.

N - nicotinoyl-O-p-chlorobenzyl - hydroxylamine. M.P. 142–144° C.

*Analysis.*—Calculated (percent): C, 59.3; H, 4.3; N, 10.6; O, 12.2; Cl, 13.3. Found (percent): C, 59.3; H, 4.1; N, 10.7; O, 12.2; Cl, 13.1.

N - nicotinoyl - O-p-chlorobenzyl-hydroxylamine. M.P. 182–184° C.

*Analysis.*—Calculated (percent): C, 56.6; H, 4.0; N, 15.3; O, 23.2. Found (percent): C, 56.6; H, 4.0; N, 15.2; O, 23.1.

EXAMPLE 8

N-L-prolyl-O-benzyl-hydroxylamine hydrochloride (a) 0.95 g. (0.0041 mol) of N-tert.-butyloxycarbonyl-L-proline hydroxamic acid are dissolved in a solution of 0.23 g. (0.0041 mol) potassium hydroxide in 20 ml. of ethanol. 0.50 ml. (0.0043 mol) of benzyl chloride are added to the solution. After refluxing for an hour, the reaction mixture gives a negative reaction with $Fe^{3+}$ ions. After cooling the potassium chloride precipitated is filtered off and the solution is evaporated in vacuo. The crystalline residue is then recrystallized from ethyl acetate (after separating a further quantity of potassium chloride from the crude product). The recrystallized product is dissolved in 90% acetic acid and precipitated by adding water to the solution. The product is collected and dried in vacuo in the presence of phosphorus pentoxide. 0.58 g. (42% of the theoretical yield) of N-(tert.-butyloxy-carbonyl)-L-prolyl-O-benzyl-hydroxylamine is obtained; M.P. 175–175° C. $R_f$-value (measured in the system ethyl acetate-pyridine-glacial acetic acid-water 30:2.5: 0.75:1.4) 0.85.

(b) The protective group of the above product can be split off by the method described in Example 1(b); the N - L - prolyl-O-benzyl-hydroxylamine hydrochloride obtained in this way melts at 184° C.

EXAMPLE 9

N-benzyloxycarbonyl-glycyl-O-benzyl-hydroxylamine

N - benzyloxycarbonyl-glycine-hydroxamic acid is reacted with benzyl chloride as described in Example 8(a), but an equivalent amount of sodium hydroxide dissolved in ethanol is used instead of potassium hydroxide. The N - benzyloxycarbonyl - glycyl - O-benzyl-hydroxylamine obtained is recrystallized from ethyl acetate; M.P. 127–128° C.; yield 34%.

EXAMPLE 10

N-glycyl-O-benzyl-hydroxylamine hydrobromide 0.90 g. (0.01 mol) of glycine hydroxamic acid (O-glycyl-hydroxylamine) are dissolved in 10 ml. of water and 1.06 g. (0.01 mol) of sodium carbonate and 1.54 ml. (0.013 mol) benzyl bromide are added thereto. After stirring for 24 hours at room temperature the mixture gives only a very slight positive reaction with ferric chloride. 10 ml. of ethylacetate are added to the mixture which is then stirred for 5 minutes, the precipitated product (0.25 g.) is filtered off and the organic layer of the filtrate is separated. The aqueous layer is saturated with sodium chloride and extracted four times with 10 ml. ethyl acetate. The ethyl acetate extracts are unified, dried over anhydrous sodium sulphate and evaporated in vacuo. Further 0.25 g. of the product is obtained as residue. The two portions of the N-glycyl-O-benzyl-hydroxylamine thus obtained are combined, dissolved in 8 ml. of anhydrous ether and converted into the hydrobromide by the addition of a few drops of a 4 N hydrobromic acid solution in ethyl acetate. A further quantity of anhydrous ether is added to complete the precipitation of the hydrobromide. The N-glycyl-O-benzyl-hydroxylamine hydrobromide obtained in this way is then recrystallized from a mixture of ethanol and ether. Yield 0.29 g. (11% of the theoretical yield); M.P. 119–123° C.

What we claim is:

1. An N-acylated hydroxylamine derivative of the formula

Ac—NH—O—X wherein Ac is selected from the group consisting of prolyl, nicotinoyl and isonicotinoyl, and X is benzyl or benzyl substituted by halogen, lower alkyl, lower alkoxy or the nitro group, and the pharmaceutically acceptable acid addition salts thereof.

2. N-L-prolyl-O-p-nitrobenzyl-hydroxylamine and the pharmaceutically acceptable acid addition salts thereof.

3. N-L-prolyl-O-benzyl-hydroxylamine and the pharmaceutically acceptable acid addition salts thereof.

4. N-L-prolyl-O-p-chlorobenzyl-hydroxylamine and the pharmaceutically acceptable acid addition salts thereof.

5. N-nicotinyl-O-benzylhydroxylamine and the pharmaceutically acceptable acid addition salts thereof.

6. N-isonicotinyl-O-benzyl-hydroxylamine and the pharmaceutically acceptable acid addition salts thereof.

References Cited

UNITED STATES PATENTS 3,400,132   9/1968   Horrom 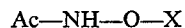 260—295

ALAN L. ROTMAN, Primary Examiner

U.S. Cl. X.R.

260—295.5 A, 326, 562 R, 562 S, 999